(12) United States Patent
Maurya et al.

(10) Patent No.: US 7,620,392 B1
(45) Date of Patent: Nov. 17, 2009

(54) METHOD AND SYSTEM FOR DISTRIBUTING AND UPDATING SOFTWARE IN WIRELESS DEVICES

(75) Inventors: Sanjiv Maurya, Fremont, CA (US); Chih-Yu Chow, Palo Alto, CA (US); Tony Robinson, Palo Alto, CA (US)

(73) Assignee: Good Technology, Inc., Santa Clara, CA (US)

( * ) Notice: Subject to any disclaimer, the term of this patent is extended or adjusted under 35 U.S.C. 154(b) by 535 days.

(21) Appl. No.: 11/363,582

(22) Filed: Feb. 27, 2006

(51) Int. Cl.
*H04M 3/00* (2006.01)
*H04M 1/00* (2006.01)

(52) U.S. Cl. .................. 455/418; 455/419; 455/420; 455/550.1

(58) Field of Classification Search ............ 370/310, 370/328; 455/414.1, 418, 419, 420, 550.1
See application file for complete search history.

(56) References Cited

U.S. PATENT DOCUMENTS

| | | | |
|---|---|---|---|
| 6,167,448 A | 12/2000 | Hemphill et al. | |
| 6,308,061 B1 * | 10/2001 | Criss et al. | 455/418 |
| 6,425,126 B1 | 7/2002 | Branson et al. | |
| 6,735,434 B2 | 5/2004 | Criss et al. | |
| 7,073,137 B2 * | 7/2006 | Hassanin et al. | 715/853 |
| 7,133,756 B2 * | 11/2006 | Jammu et al. | 701/29 |
| 7,340,389 B2 * | 3/2008 | Vargas | 704/8 |
| 2001/0029178 A1 * | 10/2001 | Criss et al. | 455/419 |
| 2001/0046854 A1 * | 11/2001 | Henry et al. | 455/419 |
| 2001/0049263 A1 * | 12/2001 | Zhang | 455/67.1 |
| 2001/0053688 A1 * | 12/2001 | Rignell et al. | 455/414 |
| 2002/0055355 A1 * | 5/2002 | Ikeda | 455/419 |
| 2003/0022661 A1 * | 1/2003 | Guterman | 455/418 |
| 2003/0143991 A1 * | 7/2003 | Minear et al. | 455/419 |
| 2004/0092255 A1 | 5/2004 | Ji et al. | |
| 2004/0098420 A1 | 5/2004 | Peng | |
| 2004/0098421 A1 * | 5/2004 | Peng | 707/203 |
| 2004/0203693 A1 * | 10/2004 | Mehta et al. | 455/419 |
| 2004/0214599 A1 * | 10/2004 | Ogino | 455/556.1 |
| 2005/0186952 A1 * | 8/2005 | Kitajima | 455/419 |
| 2006/0025123 A1 * | 2/2006 | Majmundar et al. | 455/419 |
| 2006/0046703 A1 * | 3/2006 | Liu et al. | 455/418 |
| 2006/0073820 A1 * | 4/2006 | Craswell et al. | 455/419 |
| 2006/0106806 A1 * | 5/2006 | Sperling et al. | 707/10 |
| 2006/0206537 A1 | 9/2006 | Chiang | |
| 2006/0217111 A1 * | 9/2006 | Marolia et al. | 455/418 |
| 2006/0229027 A1 * | 10/2006 | Wang et al. | 455/73 |
| 2006/0242621 A1 * | 10/2006 | Ye et al. | 717/105 |
| 2007/0042766 A1 * | 2/2007 | Herle | 455/419 |
| 2008/0125105 A1 | 5/2008 | Qumei et al. | |

OTHER PUBLICATIONS

Rarlabs Download page. http://web.archive.org/web/20020603234419/http://www.rarlab.com/download.htm. Capture by Wayback Machine on Jun. 03, 2002.*

* cited by examiner

*Primary Examiner*—Lester Kincaid
*Assistant Examiner*—Nathan Mitchell
(74) *Attorney, Agent, or Firm*—Blakely, Sokoloff, Taylor & Zafman LLP (57) ABSTRACT

A method is disclosed. The method includes receiving an update package from a wireless service provider that includes information indicating that multiple language versions of an update are included in the update package. Based on the information, the method further specifies an update associated with a language from the update package, and transmits the update associated with the language to a wireless device.

20 Claims, 6 Drawing Sheets

Update Package 300

GoodLink Policy 3.2.0 =

{
3.2.1 English,
3.2.2 German,
3.2.3 French,
3.2.4 Italian,
3.2.5 Spanish
}

METHOD AND SYSTEM FOR DISTRIBUTING AND UPDATING SOFTWARE IN WIRELESS DEVICES

FIELD OF THE INVENTION

This invention relates generally to the field of wireless networks. More particularly, the invention relates to distributing and updating software in wireless devices.

BACKGROUND

A variety of wireless data processing devices have been introduced over the past several years. These include wireless personal digital assistants ("PDAs") such as the Palm® VIIx handheld, cellular phones equipped with data processing capabilities (e.g., those which include wireless application protocol ("WAP") support), and, more recently, wireless messaging devices such as the Blackberry™ wireless pager developed by Research In Motion ("RIM").™

Currently, in order to distribute software to wireless devices, the devices are cradled and/or connected to a computer system for software to be installed to a wireless device. Additionally, some software to be installed on the device may be language specific, or device specific. In this case software running on a computer system controls what version of the software is to be installed on the wireless device, or users may choose from a set of options provided.

BRIEF DESCRIPTION OF THE DRAWINGS

A better understanding of the present invention can be obtained from the following detailed description in conjunction with the following drawings, in which.

DETAILED DESCRIPTION

According to one embodiment a method for updating a wireless device is disclosed. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
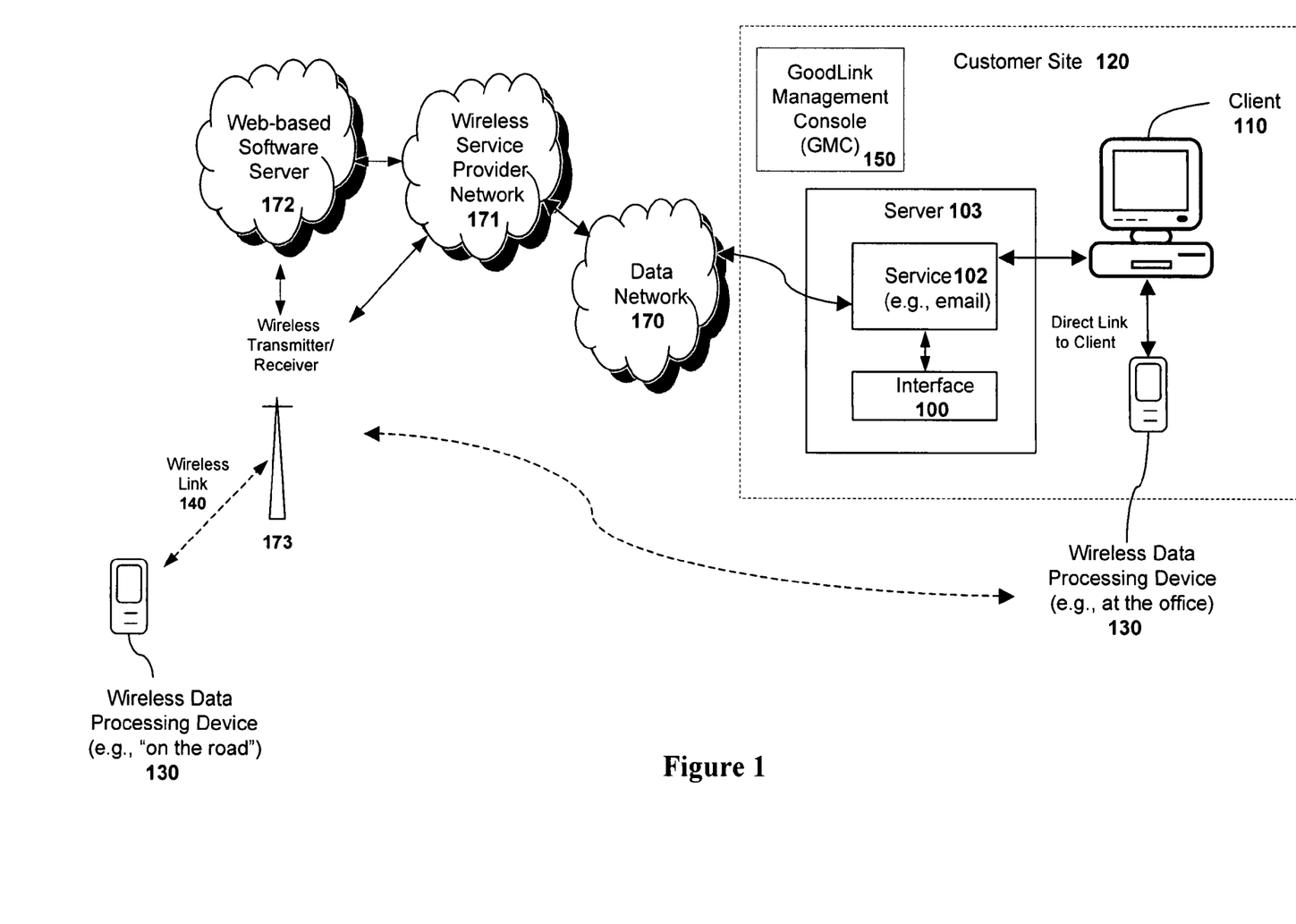
FIG. 1 illustrates one embodiment of a network.

FIG. 1 illustrates one embodiment of a network architecture. A "customer site" 120 is illustrated in FIG. 1 and may be any local-area or wide-area network over which a plurality of servers 103 and clients 110 communicate. For example, customer site 120 may include all servers and clients maintained by a single corporation.

Servers 103 may provide a variety of different messaging and groupware services 102 to network users (e.g., e-mail, instant messaging, calendaring, etc). In one embodiment, these services are provided by Microsoft Exchange.™ However, the underlying principles of the invention are not limited to any particular messaging/groupware platform.

In one embodiment, an interface 100 forwards data objects (e.g., e-mail messages, instant messages, calendar data, etc.) maintained by service 102 to a plurality of wireless data processing devices (represented in FIG. 1 by device 130) via an external data network 170 and/or a wireless service provider network 171. For example, if the service 102 includes an e-mail database, the interface 100 transmits any new e-mails, which arrive in a user's mailbox on the service 102 to the user's wireless data processing device 130 (over the network(s) 170 and/or 171).

Alternatively, or in addition, service 102 may provide the e-mail to the user's local computer (e.g., client 110) upon request (e.g., so that the user will receive the e-mail on his/her device 130 when out of the office and on his/her personal computer 110 when in the office). Conversely, e-mail messages transmitted from the user's wireless data processing device 130 are transmitted to the service 102 via the interface 100.

In one embodiment, interface 100 is a software module adapted to work with the particular service 102. It should be noted, however, that interface 100 may be implemented in hardware or any combination of hardware and software while still complying with the underlying principles of the invention.

In one embodiment, the external data network 170 includes a plurality of databases, servers/clients (not shown) and other networking hardware (e.g., routers, hubs, etc) for transmitting data between the interface 100 and the devices 130. In one embodiment, the interface 100 encapsulates data in one or more packets having an address identifying the devices 130 (e.g., such as a 24-bit Mobitex Access Number ("MAN #")).

The external data network 170 transmits the packets to a wireless service provider network 171, which in turn, transmits the packets (or the data contained therein) over wireless communication link 173 (e.g. cell tower) to the device 130. In one embodiment, the wireless service provider network is a CDMA 2000 network. However, various other network types may be employed (e.g., Mobitex, GPRS, PCS, etc.) while still complying with the underlying principles of the invention.

It should be noted that the network service provider network 171 and the external data network 170 (and associated interface 100) may be owned/operated by the same organization or, alternatively, the owner/operator of the external data network 170 may lease wireless services from the wireless service provider network. The underlying principles of the invention are not limited to any particular service arrangement.

In one embodiment, customer site 120 includes a management console (MC) 150. In a further embodiment, MC 150 is a GoodLink™ management console (GMC) developed by Good Technology®. Further wireless service provider network 171 is connected to a web-based software server 172. In one embodiment, web-based software server 172 is a webstore, which is used to distribute updates and applications to wireless devices (e.g. device 130).

According to one embodiment, updates and/or applications for device 130 are transmitted to web-based software server 172 from wireless service provider network 171, which are available for download by device 130. In one embodiment, the application to be downloaded is GoodLink™ client developed by Good Technology®. In another embodiment, notification of the availability of updates and/or applications is transmitted to customer site 120. At customer site 120, MC 150 allows an administrator to assign software policies for device 130. In one embodiment, the software policies determine which update and/or application notifications device 130 will receive.

Based on the software policies, customer site 120 then transmits a message to device 130 notifying device 130 of the updates and/or applications that are available to be downloaded from web-based software server 172.

Figure 2:
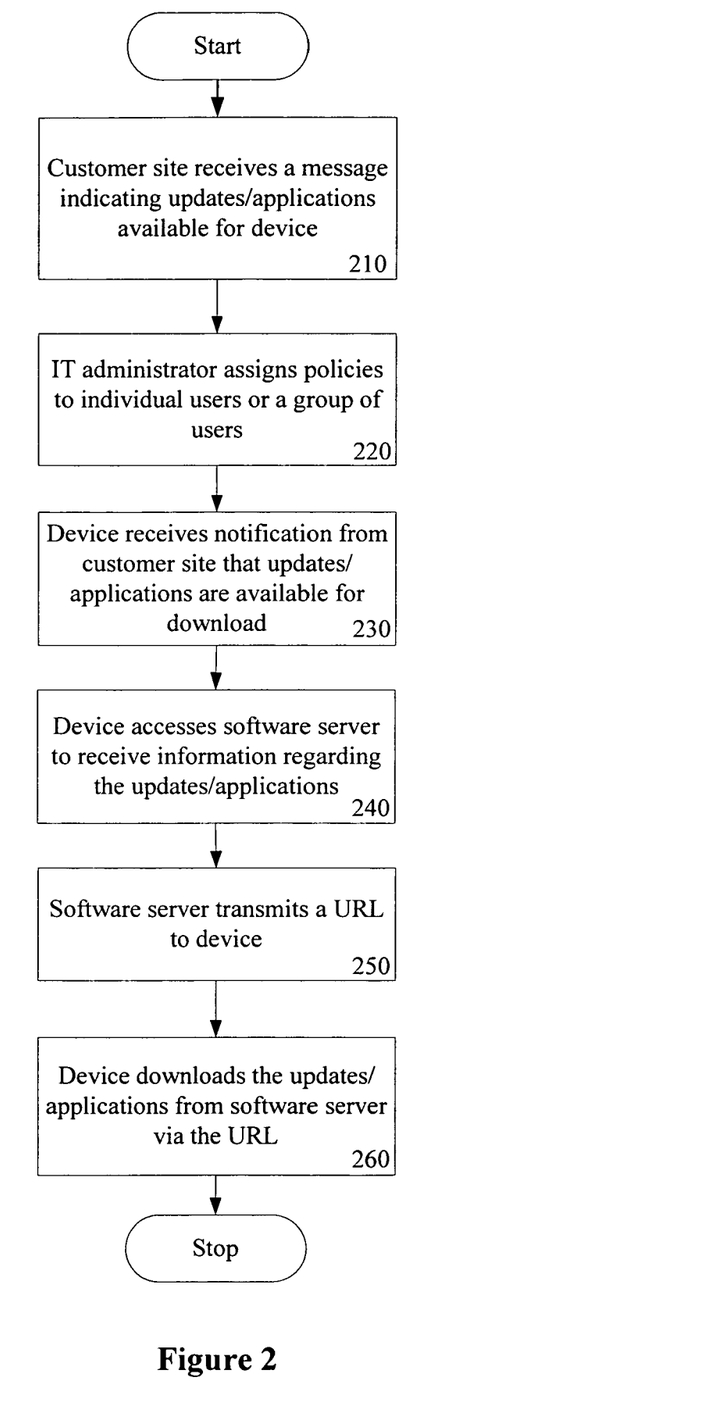
FIG. 2 illustrates one embodiment of a flow diagram for a wireless device downloading updates and/or applications from a web-based software server.

FIG. 2 illustrates one embodiment of a flow diagram illustrating the process of device 130 downloading updates and/or applications from web-based software server 172. At process block 210, customer site 120 receives a message indicating that there are updates and/or applications available for device 130 to download. At process block 220, an IT administrator assigns software policies to individual users and/or a group of users (e.g. device 130). In one embodiment, a software policy defines a rule, which uniquely identifies the updates and/or applications.

At process block 230, device 130, based on the software policy, receives notification from customer site 120 that updates and/or applications are available for download. At process block 240, device 130 accesses web-based software server 172 to receive information regarding the updates and/or applications. At process block 250, web-based software server 172 transmits a universal resource locator (URL) to device 130 that indicates the location of the updates and/or applications. At process block 260, device 130 downloads the updates and/or applications from web-based software server 172 via the received URL.

Downloading updates and/or applications from a web-based software server reduces the burden on the bandwidth of a data network by spreading out the time when devices will download an update and/or application is described.

Figure 3:
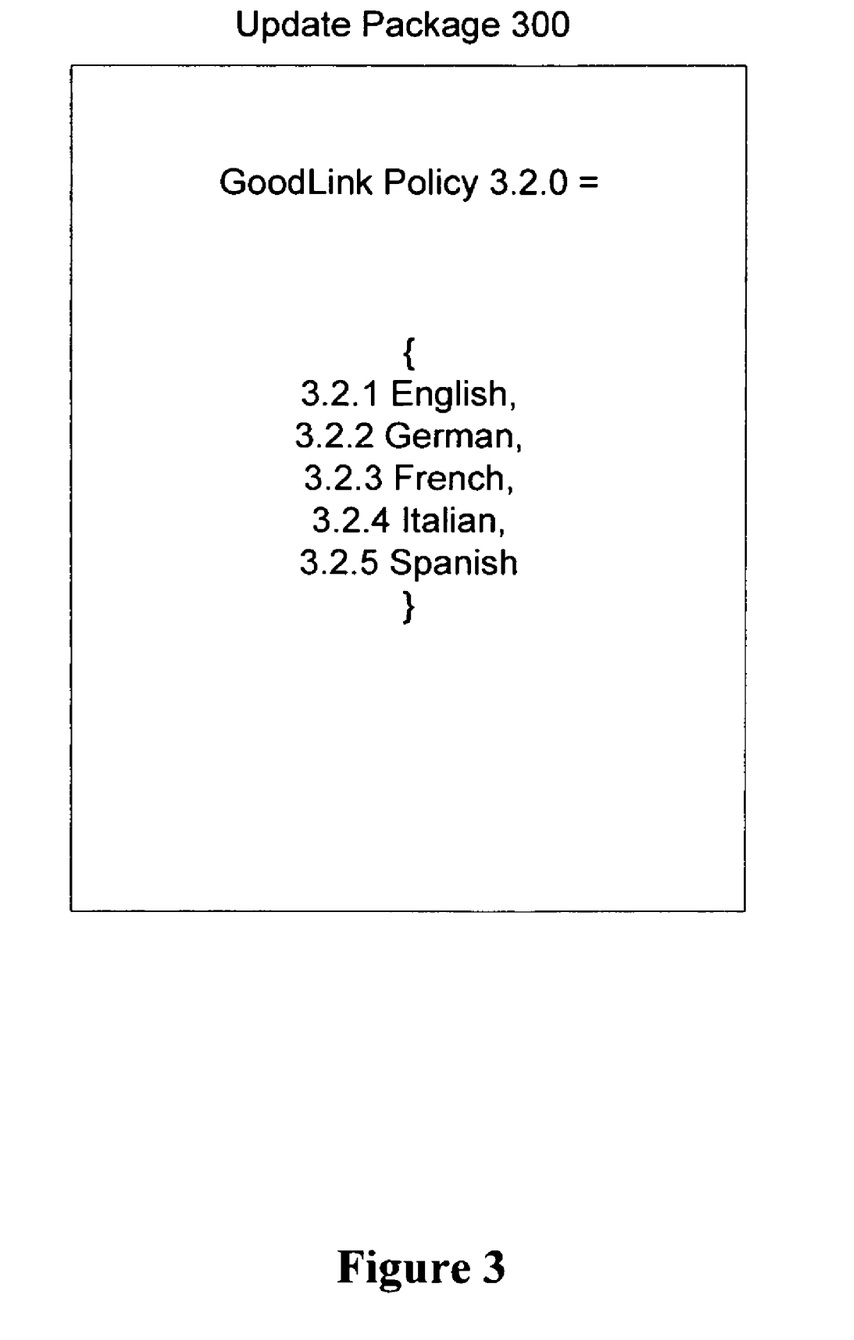
FIG. 3 illustrates one embodiment of an update package.

In another embodiment of the present invention a mechanism to distribute multi-language applications and updates in a package format is disclosed. FIG. 3 illustrates one embodiment of an update package 300. Update package 300 includes a similar software update provided in five different languages (i.e. English, German, French, Italian and Spanish). However, other languages and a different number of languages may be used.

In one embodiment, web-based software server 172 decides, based on information received from device 130, which one of the software updates in update package 300 that device 130 will receive. Accordingly, the device 130 receives the version of the update that corresponds to its specified language.

In one embodiment, update package 300 has a compatibility matrix included with it. This compatibility matrix is included in meta-data associated with update package 300. The compatibility matrix includes information describing the languages supported by update package 300. An IT administrator may use the information to know the content of update package 300.

The following is an example of one embodiment of a compatibility matrix:

$$ComparabilityMatrix = \left\{ \begin{bmatrix} locale = EN \mid GUID = \text{Guid3\_2\_1} \\ locale = DE \mid GUID = \text{Guid3\_2\_2} \\ locale = FR \mid GUID = \text{Guid3\_2\_3} \\ locale = IT \mid GUID = \text{Guid3\_2\_4} \\ locale = SP \mid GUID = \text{Guid3\_2\_5} \end{bmatrix} \right\}$$

The locale and GUID tags in the compatibility matrix are to identify rules that are associated with each update in update package 300. For example, 'locale=DE' is a rule that identifies that the update is designated for devices with German as the device language.

Figure 4:
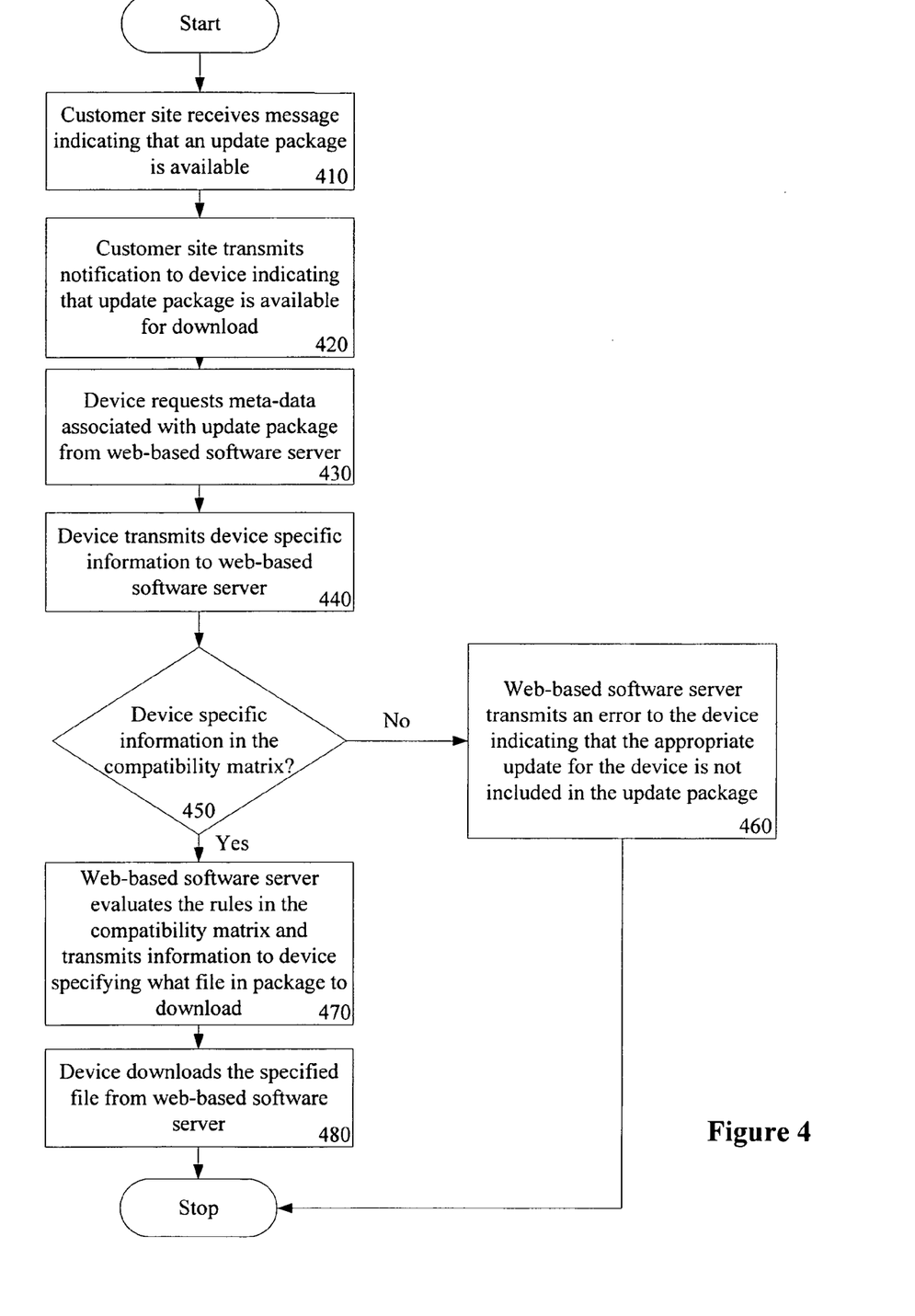
FIG. 4 illustrates one embodiment of a wireless device receiving an update from an update package.

FIG. 4 illustrates one embodiment of a device 130 receiving an update from update package 300. At process block 410, customer site 120 receives a message indicating that update package 300 is available for device 130. At process block 420, customer site 120 transmits a notification to device 130 indicating that update package 300 is available for device 130 to download.

At process block 430, device 130 requests meta-data associated with update package 300 from web-based software server 172. Device 130 transmits device specific information to web-based software server 172, process block 440. At decision block 450, web-based software server 172 checks the device specific information to determine whether the update associated with the device specific information is included in the compatibility matrix.

If the update associated with the device specific information is not included in the compatibility matrix, web-based software server 172 transmits an error to device 130 indicating that the appropriate update for device 130 is not included in update package 300, process block 460.

If the update associated with the device specific information is included in the compatibility matrix, web-based software server 172 evaluates the rules in the compatibility matrix and transmits information to device 130 specifying to device 130 what file in update package 300 to download, process block 470. At process block 480, device 130 downloads the specified file in update package 300 from web-based software server 172.

Receiving an update from an update package allows an IT administrator to globally deploy an update to all users regardless of their locale or language.

In another embodiment, a mechanism to distribute the load placed on a network is described. For Example, a network (e.g. wireless communication link 173) may only be able to handle a limited number of connections at the same time. In one embodiment, the maximum number of connections that can be supported simultaneously is thirty. However, other values may be used.

In order to minimize the number of devices downloading an update from a specific cell tower, a download restriction is associated with the updates.

Figure 5:
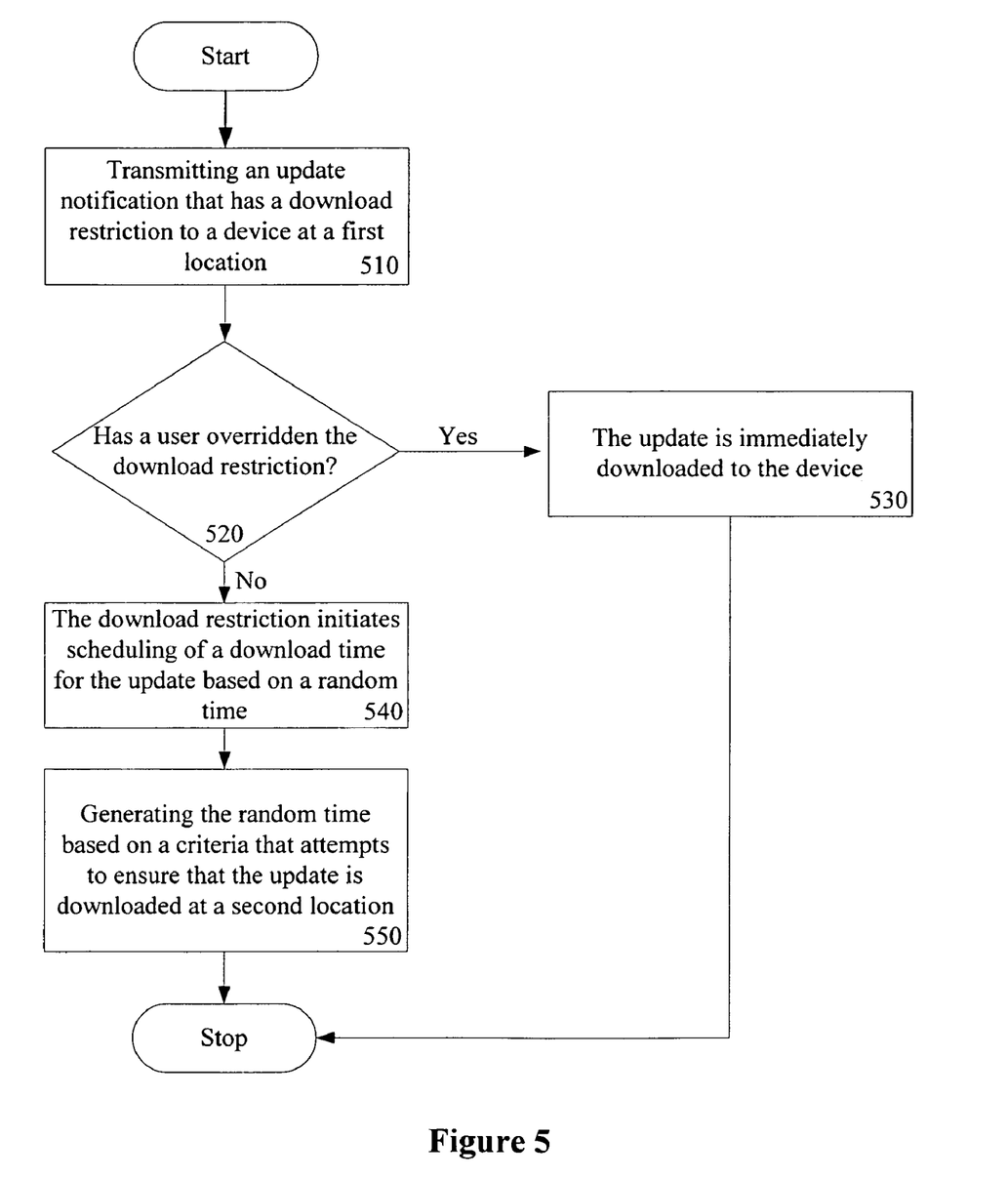
FIG. 5 illustrates one embodiment of restricting where a device is located when it downloads updates.

FIG. 5 illustrates one embodiment of restricting where device 130 is located when it downloads updates. At process block 510, an update notification that has a download restriction associated with it is transmitted to device 130 at a first location. In one embodiment, the first location is an office. At decision block 520, it is determined whether a user has overridden the download restriction. If a user has overridden the download restriction the update is immediately downloaded to device 130, process block 530.

If a user has not overridden the download restriction, the download restriction initiates scheduling of a download time for the update based on a random time, process block 540. At process block 550, the random time is generated based on a criteria. The criteria attempts to ensure that device 130 will download the update at a second location (e.g. a house). In one embodiment, the criteria restricts the random time to after 8 pm and before 2 am. However, other time restrictions may be used.

The above-mentioned process effectively alters the location of a device when the download occurs. The benefit is to distribute the load of downloading updates over a range of cell towers.

Figure 6:
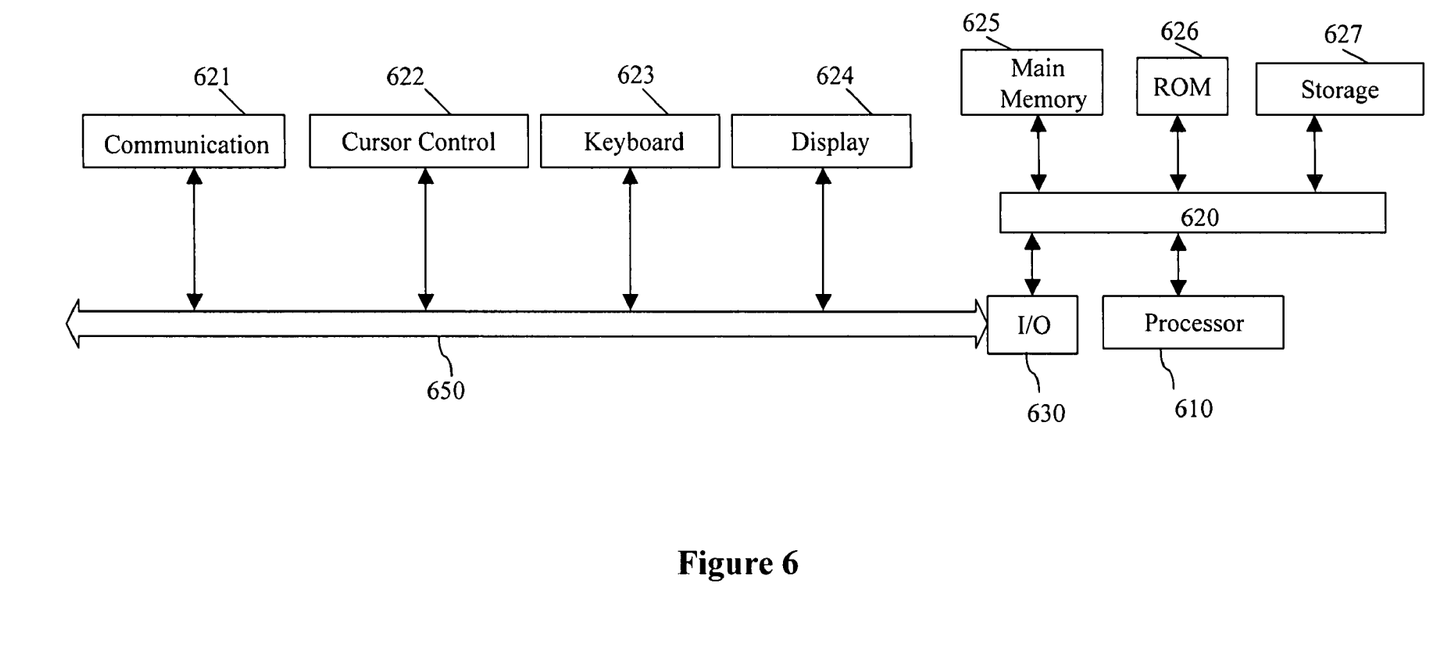
FIG. 6 illustrates one embodiment of a computer system.

FIG. 6 illustrates one embodiment of a computer system 600 on which device 130 and or server 103 may be implemented. Computer system 600 includes a system bus 620 for communicating information, and a processor 610 coupled to bus 620 for processing information. According to one embodiment, processor 610 is implemented using one of the multitudes of Motorola ARM family of processors of microprocessors. Nevertheless one of ordinary skill in the art will appreciate that other processors may be used.

Computer system 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Computer system 600 also may include a read only memory (ROM) and/or other static storage device 626 coupled to bus 620 for storing static information and instructions used by processor 610.

A data storage device 625 such as a magnetic disk or optical disc and its corresponding drive may also be coupled to computer system 600 for storing information and instructions. Computer system 600 can also be coupled to a second I/O bus 650 via an I/O interface 630. A plurality of I/O devices may be coupled to I/O bus 650, including a display device 624; an input device (e.g., an alphanumeric input device 623 and/or a cursor control device 622).

The communication device 621 is for accessing other computers (servers or clients) via network 170. The communication device 621 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while illustrated as an interface 100 to a service 102 executed on a server 103 (see FIG. 1); it will be appreciated that the underlying principles of the invention may be implemented on a single client in which the client transmits data over a network. Accordingly, the scope and spirit of the invention should be judged in terms of the claims that follow.

What is claimed is:

1. A method comprising:
   a wireless device receiving a notification from a customer server indicating that an update package including multiple language versions is available for the wireless device;
   the wireless device transmitting device specific information to a web-based software server; and
   the wireless device receiving an update from the web-based software server associated with a language from the update package corresponding to a language used at the wireless device.

2. The method of claim 1 further comprising requesting meta-data associated with the update package.

3. The method of claim 1 further comprising a customer server receiving the update package from a wireless service provider network.

4. The method of claim 3 further comprising:
   uploading the update package to the web-based software server; and
   determining whether the device specific information is included in a compatibility matrix associated with the software package.

5. The method of claim 4 wherein if the device specific information is included in the compatibility matrix, evaluating the compatibility matrix and transmitting information to the wireless device specifying what file in the update package to download.

6. The method of claim 4 wherein if the device specific information is not included in the compatibility matrix, transmitting an error message to the wireless device.

7. The method of claim 1 further comprising receiving an indication that the update package is available to download.

8. A system comprising:
   a wireless device;
   a wireless service provider network coupled to the wireless device;
   a customer site coupled to the wireless device via the wireless service provider network to receive a message indicating that an update package is available for the wireless device; and
   a web-based software server to receive device specific information from the wireless device and to transmit a message to the wireless device specifying an update associated with a language from the update package corresponding to a language used at the wireless device.

9. The system of claim 8 wherein the customer site includes a management console to configure rules associated with the updates package.

10. The system of claim 8 wherein the wireless device requests the web-based software server for meta-data associated with the update package.

11. The system of claim 10 wherein the wireless device transmits device specific information to the web-based software server.

12. The system of claim 11 wherein the web-based software server determines whether the device specific information is included in a compatibility matrix associated with the update package.

13. The system of claim 12 wherein if the web-based software server determines that the device specific information is included in the compatibility matrix, the web-based software server evaluates the compatibility matrix and transmits information to the wireless device specifying what file in the update package to download.

14. The system of claim 12 wherein if the web-based software server determines that the device specific information is not included in the compatibility matrix, the web-based software server transmits an error message to the wireless device.

15. A machine-readable medium having stored thereon data representing sets of instructions which, when executed by a machine, cause the machine to:

receive a notification from a customer server indicating that an update package including multiple language versions is available;

transmitting device specific information to a web-based software server; and receiving an update from the web-based software server associated with a language from the update package corresponding to a language used.

16. The machine-readable medium of claim 15 wherein the sets of instructions, when executed by the machine, further cause the machine to request meta-data associated with the update package.

17. The machine-readable medium of claim 15 wherein the sets of instructions, when executed by the machine, further cause the machine to transmit device specific information to a web-based software server.

18. The machine-readable medium of claim 17 wherein the sets of instructions, when executed by the machine, further cause the machine to:

upload the software package to the web-based software server; and determine whether the device specific information is included in a compatibility matrix associated with the software package.

19. The machine-readable medium of claim 18 wherein if the device specific information is included in the compatibility matrix, the sets of instructions, when executed by the machine, further cause the machine to evaluate the compatibility matrix and transmitting information to the wireless device specifying what file in the update package to download.

20. The machine-readable medium of claim 18 wherein if the device specific information is not included in the compatibility matrix, the sets of instructions, when executed by the machine, further cause the machine to transmit an error message to the wireless device.

\* \* \* \* \*

UNITED STATES PATENT AND TRADEMARK OFFICE
CERTIFICATE OF CORRECTION

PATENT NO.       : 7,620,392 B1                                          Page 1 of 1
APPLICATION NO.  : 11/363582
DATED            : November 17, 2009
INVENTOR(S)      : Maurya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 580 days.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,620,392 B1  Page 1 of 1
APPLICATION NO. : 11/363582
DATED : November 17, 2009
INVENTOR(S) : Sanjiv Maurya et al.

It is certified that error appears in the above-identified patent and that said Letters Patent is hereby corrected as shown below:

In the Specifications:

At Column 1, Line 20, change "("RIM").™" to --("RIM")™.--.

At Column 2, Line 7, change "Exchange.™" to --Exchange™.--.

At Column 5, Line 12, change "and or" to --and/or--.

Signed and Sealed this

Fourteenth Day of December, 2010

David J. Kappos
*Director of the United States Patent and Trademark Office*